Patented July 5, 1927.

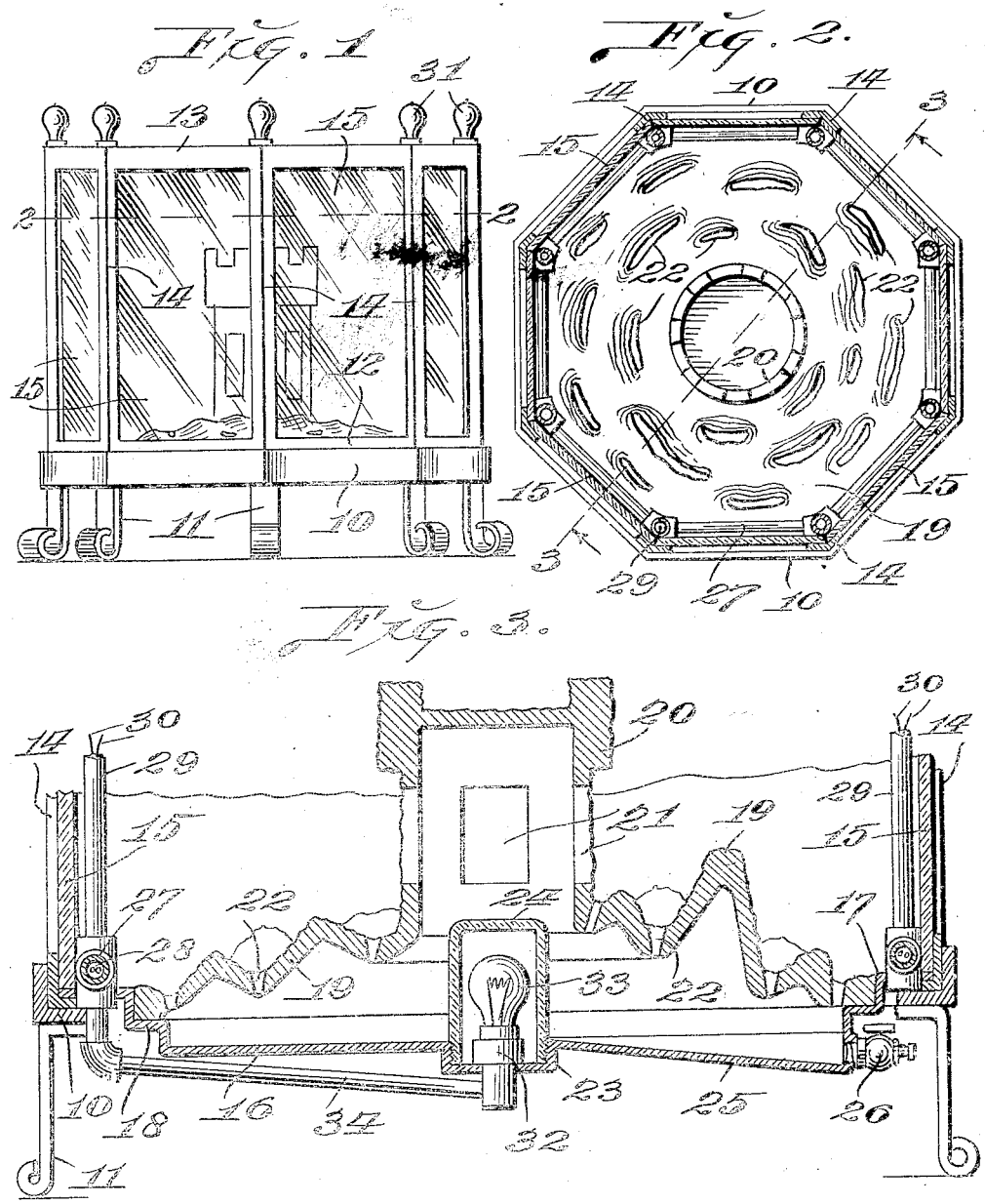

1,634,305

UNITED STATES PATENT OFFICE.

JOHN A. SCHRIMP, OF LOS ANGELES, CALIFORNIA.

ILLUMINATED AQUARIUM.

Application filed May 26, 1926. Serial No. 111,855.

My invention relates to an illuminated aquarium and the structure forming the subject matter of my present invention is an improvement on a somewhat similar structure disclosed in my co-pending application for U. S. Letters Patent filed January 7, 1926, Serial No. 79,756.

The principal objects of my invention are to generally improve upon and simplify the construction of the aquarium disclosed in my aforesaid co-pending application, and to provide an improved form of bottom or base plate for the aquarium, which base plate is preferably formed of vitrified earthen material, the same being shaped so as to represent miniature hills, mountains, and valleys; further, to construct the base member so that it is readily removable from the lower portion of the aquarium in order that the aquarium and base member may be readily cleaned; and further, to form through the earthenware base member a series of apertures which permit sediment, small particles of food, etc., to pass into the space beneath the base member, thereby keeping the water within the aquarium comparatively clean.

With the foregoing and other objects in view, my invention consists in certain novel features of construction and arrangemet of parts that will hereinafter be more fully described and claimed and illustrated in the accompanying drawing, in which—

Fig. 1 is a side elevational view of an equarium embodying the principles of my invention.

Fig. 2 is a horizontal section taken on the line 2—2 of Fig. 1.

Fig. 3 is an enlarged cross section taken on line 3—3 of Fig. 2.

Referring by numerals to the accompanying drawings which illustrate a practical embodiment of my invention, 10 designates a supporting frame for the body of the aquarium, which frame consists of an angle bar bent to form a circular or polygonal member with one of its flanges occupying a vertical plane and the other flange occupying a horizontal plane and being inwardly presented, thus providing a support for the aquarium body.

Frame 10 is supported by short legs 11, preferably formed of metal. The aquarium body comprises a skeleton frame, preferably formed of metal, and said frame includes base rails 12, top rails 13 and vertically disposed posts 14. These rails and posts are preferably formed integral with each other and arranged in the openings between the uprights or posts 14 are sections 15 of glass, the edges of which are sealed to each other and to the parts of the frame by means of a suitable water-proof cement or putty.

The bottom of the aquarium comprises a shallow pan-like member 16, preferably formed of sheet metal having on its edge a horizontally disposed flange 17 that rests directly upon and which is sealed to the inwardly presented flanges of the lower members 12 of the aquarium frame.

Formed in the member 16 just inside the flange 17 is a depression 18, the same serving as a seat for the marginal portion of the removable bottom 19 of the aquarium, which removable bottom is preferably formed of vitrified earthen material that is shaped to represent miniature hills, mountains, and valleys, and the central portion of said removable bottom being extended upward as designated by 20 to represent a miniature castle or tower, the walls of which are provided with openings 21.

Formed through the removable bottom 19 and preferably arranged in the lower portions of the depressions or valleys therein are slots or apertures 22 which permit all sediment and the like which may gravitate to the bottom of the aquarium to pass into the space between the removable bottom 19 and the bottom member 16.

Formed at the center of bottom member 16 is a depression 23 that is internally threaded and removably seated therein is the externally threaded lower end of an inverted cup-shaped member 24 of glass. Formed in the bottom member 16 and leading from the depression 23 outwardly to the edge of said bottom member is a trough-like depression 25 which serves as a drain when the water within the aquarium is being drawn off, and arranged in the wall of member 16 at the outer end of this depression is a valve 26.

Extending entirely around the inner lower corner of the aquarium body and resting on flange 17 is a conduit 27, preferably formed of metal tubing, and arranged therein are current carrying wires 28. Leading from the conduit 27 upwardly and arranged immediately behind each post or upright 14 is a conduit 29 containing branch conductors 30 and which latter lead to small electric lamps 31 that are positioned in sockets in the upper ends of the conduits 29. These sockets are preferably located inside the upper rail 13.

Arranged within the depression 23 is a socket 32 for an electric lamp 33 that is positioned within the transparent cup 24 and leading to this socket 32 from the conductors 28 are branch conductors that are enclosed in a suitably arranged conduit 34, the latter being positioned beneath bottom plate 16.

When current is supplied to the conductors 28, the lamps 31 and 33 will be lighted, thereby adding materially to the appearance of the aquarium, particularly at night and the interior of the aquarium will be illuminated to a certain extent as a result of light rays from lamp 33 passing outwardly through the openings 22 in the removable bottom member 19 and through the window openings 21 in the castle-representing member 20.

An aquarium constructed in accordance with my invention presents a novel, interesting, and pleasing appearance, is especially adapted for decorative purposes and all sediment and small particles of food that would otherwise accumulate on bottom member 19 will readily pass through the apertures 22 into the space between the members 16 and 19, where they are hidden from view and from whence they are removed through channel 25 and valve 26 when the aquarium is drained.

The earthenware bottom member 19 being shaped to represent hills, valleys and a tower or castle, adds materially to the appearance of the aquarium, and as this bottom member is formed in a single piece, it may be readily removed and cleaned.

It will be understood that minor changes in the size, form and construction of the various parts of my improved aquarium may be made and substituted for those herein shown and described without departing from the spirit of my invention, the scope of which is set forth in the appended claims.

I claim as my invention:

1. An aquarium having a double bottom, the upper member of said double bottom being bodily removable and shaped so as to represent miniature hills and valleys, there being openings formed through said removable upper member at the lower-most points in the depressions that are formed therein, an electric lamp supported on the lower member of the double bottom and positioned in the space between the upper and lower members of said double bottom and a transparent housing secured to the lower member of the double bottom and enclosing said electric lamp.

2. An aquarium having a double bottom, the lower member of which bottom is provided with a radially arranged channel, a valve at the outer end of said channel, an electric lamp supported at the center of said lower member, a transparent housing detachably secured to the lower member and enclosing said electric lamp and the upper member of said double bottom being shaped to represent miniature hills and valleys, there being openings formed through said upper member at the lower-most points of the depressions formed therein and the central portion of said upper member being extended upward to form a miniature castle having perforations in its walls.

3. An aquarium having a double bottom, the upper member of said bottom being provided with perforations, an electric lamp carried by the lower member of the double bottom and occupying the space between the upper and lower members of said bottom and a transparent housing removably secured to the lower member of the double bottom and enclosing said electric lamp.

4. The combination with an aquarium body, of a bottom member having its marginal portion secured to the lower portion of the aquarium body, an electric lamp carried by the central portion of said bottom member, a transparent member detachably secured to said bottom member and enclosing said electric lamp and a perforated false bottom removably positioned on the fixed bottom member.

5. The combination with an aquarium body, of a bottom member having its marginal portion secured to the lower portion of the aquarium body, an electric lamp carried by the central portion of said bottom member, a transparent member detachably secured to said bottom member and enclosing said electric lamp and a perforated false bottom removably positioned on the fixed bottom member, which false bottom is shaped to represent miniature hills and valleys.

6. The combination with an aquarium body having transparent side walls, of an imperforate bottom having its marginal portion supported by the lower portion of the transparent side wall of the body of the aquarium, a false bottom removably positioned upon said imperforate bottom, said false bottom being shaped so as to represent miniature hills and valleys and there being openings formed through said false bottom at the lowermost points in the depressions that are formed therein.

In testimony whereof I affix my signature.

JOHN A. SCHRIMP.